US005351324A

United States Patent [19]

Forman

[11] Patent Number: 5,351,324

[45] Date of Patent: Sep. 27, 1994

[54] FIBER OPTIC SECURITY SEAL INCLUDING PLURAL BRAGG GRATINGS

[75] Inventor: Peter R. Forman, Los Alamos, N. Mex.

[73] Assignee: The Regents of the University of California, Office of Technology Transfer, Alameda, Calif.

[21] Appl. No.: 120,113

[22] Filed: Sep. 10, 1993

[51] Int. Cl.$^5$ ........................ G02B 6/34; G01B 11/16; H01J 5/16

[52] U.S. Cl. ........................................ 385/37; 385/15; 385/38; 385/12; 356/32; 356/35.5; 356/345; 356/347; 359/15; 359/27; 359/34; 250/227.18; 250/227.19; 250/227.14

[58] Field of Search ....................... 385/15, 10, 37, 38, 385/47, 88, 89, 14, 12; 356/32, 34, 35.5, 345, 347, 348, 352; 250/227.11, 227.18, 227.19, 227.14; 359/15, 27, 34

[56] References Cited

U.S. PATENT DOCUMENTS

| | | | |
|---|---|---|---|
| 4,398,792 | 8/1983 | Horner et al. | 359/34 X |
| 4,725,110 | 2/1988 | Glenn et al. | 385/100 X |
| 4,761,073 | 8/1988 | Meltz et al. | 356/32 |
| 4,807,950 | 2/1989 | Glenn et al. | 385/123 X |
| 4,950,883 | 8/1990 | Glenn | 250/227.14 |
| 4,996,419 | 2/1991 | Morey | 250/227.18 |
| 5,237,576 | 8/1993 | DiGiovanni et al. | 372/6 |
| 5,285,274 | 2/1994 | Tanno et al. | 385/37 X |
| 5,295,208 | 3/1994 | Caulfield et al. | 385/37 X |
| 5,295,209 | 3/1994 | Huber | 385/37 |

*Primary Examiner*—Brian Healy

*Attorney, Agent, or Firm*—Ray G. Wilson

[57] ABSTRACT

An optical security system enables the integrity of a container seal to be remotely interrogated. A plurality of Bragg gratings is written holographically into the core of at least one optical fiber placed about the container seal, where each Bragg grating has a predetermined location and a known frequency for reflecting incident light. A time domain reflectometer is provided with a variable frequency light output that corresponds to the reflecting frequencies of the Bragg gratings to output a signal that is functionally related to the location and reflecting frequency of each of the Bragg gratings.

2 Claims, 2 Drawing Sheets

FIBER OPTIC SECURITY SEAL INCLUDING PLURAL BRAGG GRATINGS

This invention relates to optical fibers with induced Bragg gratings and, in particular, to optical fibers with induced Bragg gratings forming a security pattern. This invention was made with government support under Contract No. W-7405-ENG-36 awarded by the U.S. Department of Energy. The government has certain rights in the invention.

BACKGROUND OF INVENTION

There are a variety of applications where security must be assured and where such security must be ascertained from a location remote from the secured object. Older, prior art security seals were formed from metal tapes for electrical current continuity, embossed devices that were destroyed if the seal integrity was compromised, and other clasps and loops with identifiable impressions. Such devices can readily be counterfeited and/or defeated.

U.S. Pat. No. 3,854,792, issued Dec. 17, 1974, overcomes many of the problems of the prior art by using a fiber optic bundle wherein security masks provide light transmission security patterns between an input end of the fiber bundle and an output end of the bundle. The device requires, however, sufficient space to accommodate a bundle of fibers and access to both ends of the bundle to verify the optical transmission of the bundle.

These problems are addressed by the present invention and an improved fiber optic seal device is provided. Accordingly, it is an object of the present invention to provide a fiber optic seal security system that does not require access to both ends of an optical fiber for security interrogation.

Another object of the present invention is to provide a fiber optic seal device that requires only a few optical fibers, and preferably only one optical fiber, to provide the information needed to verify seal security. Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method-/apparatus of this invention may comprise a fiber optic seal security system. At least one optical fiber has a plurality of Bragg gratings written holographically into the core of the fiber, where each Bragg grating has a predetermined location and a known frequency for reflecting incident light. A time domain reflectometer, having a variable frequency light output that corresponds to the reflecting frequencies of the Bragg gratings, receives reflected light and outputs a signal that is functionally related to the location and reflecting frequency of each of the Bragg gratings.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE DRAWINGS

Figure 1:
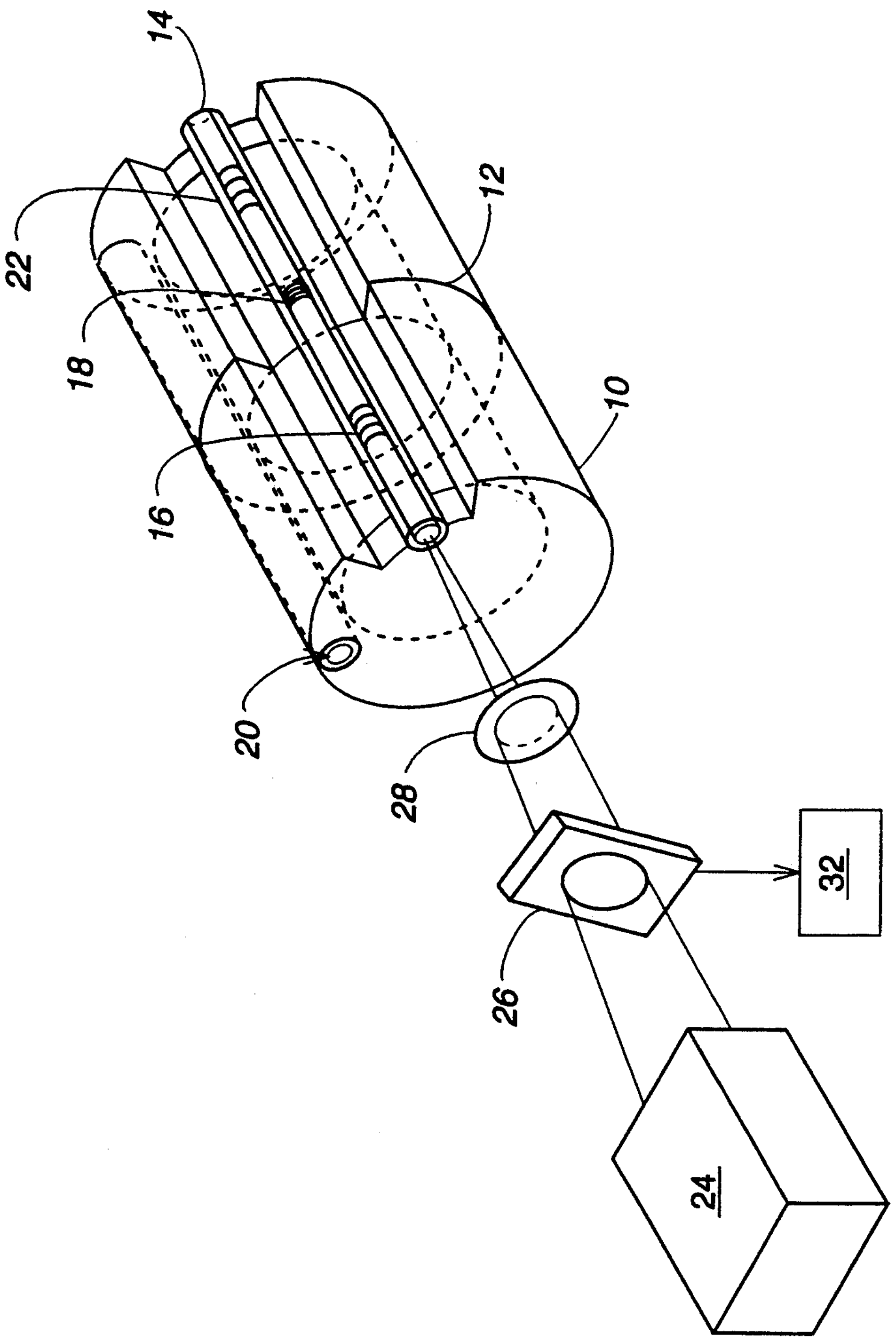
FIG. 1 is a pictorial illustration and block diagram of an optical fiber seal device according to the present invention.

Referring first to FIG. 1, there is shown a pictorial illustration of one embodiment of a fiber optic seal device according to the present invention. A sealed container 10 is illustrated with a sealed closure 12 whose integrity must be monitored. It will be appreciated that the fiber optic seal described herein may be used with a plurality of devices and may monitor a variety of conditions associated with storage integrity.

An optical fiber 14, which may be doped with, e.g., germanium, is located functionally about container 10 so that fiber 14 will be broken or distorted if the integrity of container 10 is broken or disturbed. Optical fiber 14 defines a plurality of Bragg gratings, e.g., gratings 16, 18, 22, written onto the core of fiber 14, at discrete locations along the length of fiber 14. Each Bragg grating is formed by transverse irradiation of the core of an optical fiber with a particular wavelength of light in the ultraviolet absorption band of the core material. The core is illuminated from the side with two coplanar, coherent beams incident at selected and complementary angles with respect to the axis of the core. The grating period is selected by varying the beam angles of incidence. The resulting interference pattern induces a permanent change in the refractive index of the core material to create a phase grating effective for affecting light in the core at selected wavelengths. The procedure for inducing the Bragg gratings is fully described in U.S. Pat. No. 4,725,110, incorporated herein by reference.

Each Bragg grating 16, 18, 22 now reflects a specific wavelength of light. The magnitude of this reflectivity can be about 90% and the wavelength of reflectivity is determined at the time of exposure to the UV light. Thus, the pattern of reflectivities, i.e., the location and reflected wavelength of each grating, forms a security code that can be interrogated from either end of optical fiber 14.

To interrogate the security code, a light source 24 is directed through beam splitter 26 and lens 28 into optical fiber 14. Light source 24 is preferably a coherent light source that can be varied over the range of Bragg grating reflective wavelengths. Light reflected from gratings 16, 18, and 22 is directed by beam splitter 26 onto a conventional time domain reflectometer. A suitable reflectometer 32 is available from Opto-Electronics, modified to use output laser diodes corresponding to the Bragg grating reflective wavelengths. Reflectometer 32 is locked to light source 24 so that reflectometer 32 outputs a signal indicative of both frequency and time, i.e., the grating reflective wavelength and position along fiber 14.

Figure 2:
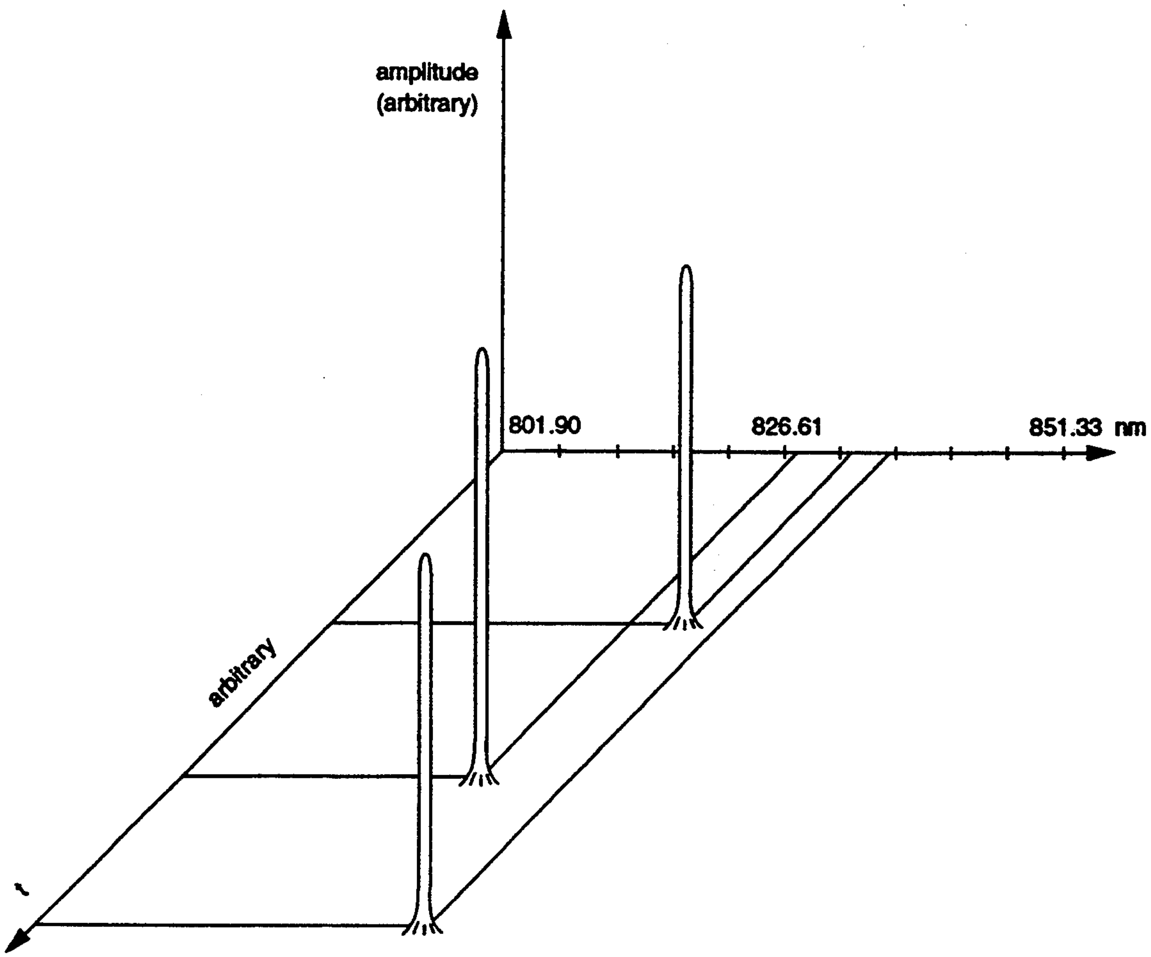
FIG. 2 graphically illustrates an output from a time domain interferometer having three induced spaced-apart Bragg gratings.

FIG. 2 graphically depicts the reflection pattern from an optical fiber having induced gratings according to the present invention. An optical fiber 80 microns in diameter with an elliptical core 1.5×2.5 microns was induced with gratings having reflectivities at wavelengths of 830, 833, and 835 nm. The fiber was a single mode fiber that maintains polarization for the incident light. FIG. 2 shows the reflections from the gratings at the selected wavelengths. A time domain reflectometer 32 (FIG. 1) further provides an output signal functionally related to the location of each reflective frequency along the fiber. While the fiber could be broken and refused, a detectable reflection at the resulting joint would appear in the reflection pattern. Likewise, if the fiber is highly strained, the reflected wavelengths would be altered as the grating is elongated.

As discussed above, after the gratings are selectively induced in the fiber, the fiber is attached around the container to be sealed in such a manner that the fiber would be broken or severely distorted if the container were opened. A single fiber might be used to seal several containers where the security code also identifies each particular container. One end of the fiber is sealed within a container and the other end is placed in a location accessible to the interrogation system. In a preferred embodiment, the extending end of the fiber is fitted with a connecting device for quick connection to the interrogation system.

Another security feature might be incorporated onto the optical fibers to verify the identity of the fiber being interrogated. In one embodiment, the extending end of the fiber 14 (see FIG. 1) is coated with a rapid crystallizing material, e.g., a copper sulfate solution or sugar solution, that forms a random pattern of crystals over the face of the connector. This pattern is recorded with holographic interferometry or surface profiling for future comparison. Thereafter, the pattern is verified before the fiber is interrogated. The crystal pattern would be destroyed each time the seal is interrogated and a new coating would be applied as the security coating.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fiber optic security seal system, comprising:

an optical fiber having a plurality of reflective Bragg gratings induced in the fiber, where each grating has a unique location and wavelength for reflecting incident light;

a light source means for providing input light to said fiber at all of said wavelengths for reflecting light from said gratings;

a time domain reflectometer for receiving reflected light from said gratings and outputting a signal functionally related to said unique location and wavelength for reflecting incident light for each said grating; and a coating over an end of said optical fiber receiving said incident light said coating having a crystal pattern that produces a unique holographic image to verify an identity of said optical fiber.

2. A fiber optic security seal system according to claim 1, wherein said optical fiber has a core doped with germanium.

* * * * *